US010997499B1

(12) United States Patent
Kayyoor et al.

(10) Patent No.: US 10,997,499 B1
(45) Date of Patent: May 4, 2021

(54) SYSTEMS AND METHODS FOR FILE SYSTEM METADATA ANALYTICS

(71) Applicant: Veritas Technologies LLC, Mountain View, CA (US)

(72) Inventors: Ashwin Kayyoor, Sunnyvale, CA (US); Meetali Vaidya, West Lafayette, IN (US); Shailesh Dargude, San Jose, CA (US); Himanshu Ashwani, Milpitas, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 1025 days.

(21) Appl. No.: 15/594,471

(22) Filed: May 12, 2017

(51) Int. Cl.
*G06N 3/08* (2006.01)
*G06N 20/00* (2019.01)

(52) U.S. Cl.
CPC .............. *G06N 3/08* (2013.01); *G06N 20/00* (2019.01)

(58) Field of Classification Search
CPC .................... G06N 3/08–088; G06N 20/00
See application file for complete search history.

(56) References Cited

U.S. PATENT DOCUMENTS

| | | | |
|---|---|---|---|
| 7,496,605 B2 * | 2/2009 | Sudhi | G06F 16/10 |
| 9,286,304 B2 * | 3/2016 | Taljanovic | G06F 16/13 |

OTHER PUBLICATIONS

"Words as Vectors", From Data to Decisions, Tag: Continuous Bag of Words (CBOW), Apr. 13, 2015, 8 pages.

* cited by examiner

*Primary Examiner* — Stanley K. Hill
(74) *Attorney, Agent, or Firm* — FisherBroyles, LLP

(57) ABSTRACT

The disclosed computer-implemented method for file system metadata analytics may include (i) creating a set of training data to train a machine learning model to analyze tokens that describe files within a file system, the set of training data comprising a first set of vectors, wherein each vector represents tokens that describes files that are frequently accessed by a common set of users, and a second set of vectors, wherein each vector represents tokens that describes files with common file path ancestors, (ii) training, using the set of training data, the machine learning model, (iii) determining, by providing at least one input token to the machine learning model, that the input token is related to at least one additional token, and (iv) performing an action responsive to observing the input token and involving the additional token and the file system. Various other methods, systems, and computer-readable media are also disclosed.

20 Claims, 5 Drawing Sheets

SYSTEMS AND METHODS FOR FILE SYSTEM METADATA ANALYTICS

BACKGROUND

Today there is a grave need to gain insight on relationship between the files and users and processes in a system and to turn this knowledge into highly efficient and effective actionable intelligence. In order to gain such insights, it may be helpful to perform content-agnostic metadata-only near-real-time analytics. On many occasions, it is extremely useful to understand the profile of a user in a filesystem environment and to find other users with similar profiles. This may be useful in extrapolating user risk behaviors to other similar users and may also be useful for suggesting or enforcing policies on users with similar access behavior. Similarly, it may be useful to discover which files are related to other files in a file system in order to enforce policies or perform other actions on the related files. In some file systems, tags on files may enable users and automated processes to locate similar files more quickly.

Unfortunately, many traditional systems for measuring file similarity may rely on examining the contents of files, a potentially time- and resource-intensive process. While some traditional systems for finding file similarity may incorporate the use of metadata tags, the unreliability of user-applied tags may render such systems less than ideally effective. Furthermore, manually tagging individual files may a burdensome activity for users, who may fail to tag all files of interest. The instant disclosure, therefore, identifies and addresses a need for systems and methods for file system metadata analytics.

SUMMARY

As will be described in greater detail below, the instant disclosure describes various systems and methods for file system metadata analytics by training machine learning models to correlate users, files, and/or tags.

In one example, a computer-implemented method for file system metadata analytics may include (i) creating a set of training data to train a machine learning model to analyze tokens within a set of tokens that describe files within a file system, the set of training data including both a first set of vectors, where each vector within the first set of vectors represents a subset of the set of tokens that describes files that are frequently accessed by a common set of users, and a second set of vectors, where each vector within the second set of vectors represents a subset of the set of tokens that describes files with a predetermined number of common file path ancestors, (ii) training, using the set of training data, the machine learning model to define a set of latent features from the set of training data, (iii) determining, by providing at least one input token from the set of tokens as input to the trained machine learning model, that the at least one input token is related to at least one additional token within the set of tokens, and (iv) performing an action responsive to observing the input token and involving the additional token and the file system in response to determining that the input token is related to the additional token.

In one embodiment, each token within the set of tokens may include a string derived from a file path of a file within the file system. In some examples, performing the action responsive to observing the input token and involving the additional token and the file system may include suggesting the additional token as a tag for a file that may include a file path that includes the input token and/or a common file path ancestor with a file that includes a file path that includes the input token. In one embodiment, the machine learning model may include a neural network.

In one embodiment, each token within the set of tokens may include a representation of a user that accesses at least one file within the file system. In some examples, performing the action responsive to observing the input token and involving the additional token and the file system may include suggesting that a related user represented by the additional token is related to a user represented by the input token. In one embodiment, the computer-implemented method may further include, in response to suggesting that the related user is related to the user, applying a data loss prevention policy rule that applies to the user to an interaction between the related user and the file system.

In one embodiment, each token within the set of tokens may include a representation of a file within the file system. In some examples, performing the action responsive to observing the input token and involving the additional token and the file system may include suggesting that a related file represented by the additional token is related to a file represented by the input token. In one embodiment, the computer-implemented method may further include performing, on the related file, an action performed on the file in response to suggesting that the related file represented by the additional token is related to the file.

In one embodiment, a system for implementing the above-described method may include (i) a creation module, stored in memory, that creates a set of training data to train a machine learning model to analyze tokens within a set of tokens that describe files within a file system, the set of training data including both a first set of vectors, where each vector within the first set of vectors represents a subset of the set of tokens that describes files that are frequently accessed by a common set of users, and a second set of vectors, where each vector within the second set of vectors represents a subset of the set of tokens that describes files with a predetermined number of common file path ancestors, (ii) a training module, stored in memory, that trains, using the set of training data, the machine learning model to define a set of latent features from the set of training data, (iii) a determination module, stored in memory, that determines, by providing at least one input token from the set of tokens as input to the trained machine learning model, that the at least one input token is related to at least one additional token within the set of tokens, (iv) a performing module, stored in memory, that performs an action responsive to observing the input token and involving the additional token and the file system in response to determining that the input token is related to the additional token, and (v) at least one physical processor configured to execute the creation module, the training module, the determination module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) create a set of training data to train a machine learning model to analyze tokens within a set of tokens that describe files within a file system, the set of training data including both a first set of vectors, where each vector within the first set of vectors represents a subset of the set of tokens that describes files that are frequently accessed by a common set of users, and a second set of vectors, where each vector within the second set of vectors represents a subset of the set of tokens that describes files with a predetermined number of common file path ancestors, (ii) train, using the set of training data, the machine learning model to define a set of latent features from the set of training data, (iii) determine, by providing at least one input token from the set of tokens as input to the trained machine learning model, that the at least one input token is related to at least one additional token within the set of tokens, and (iv) perform an action responsive to observing the input token and involving the additional token and the file system in response to determining that the input token is related to the additional token.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
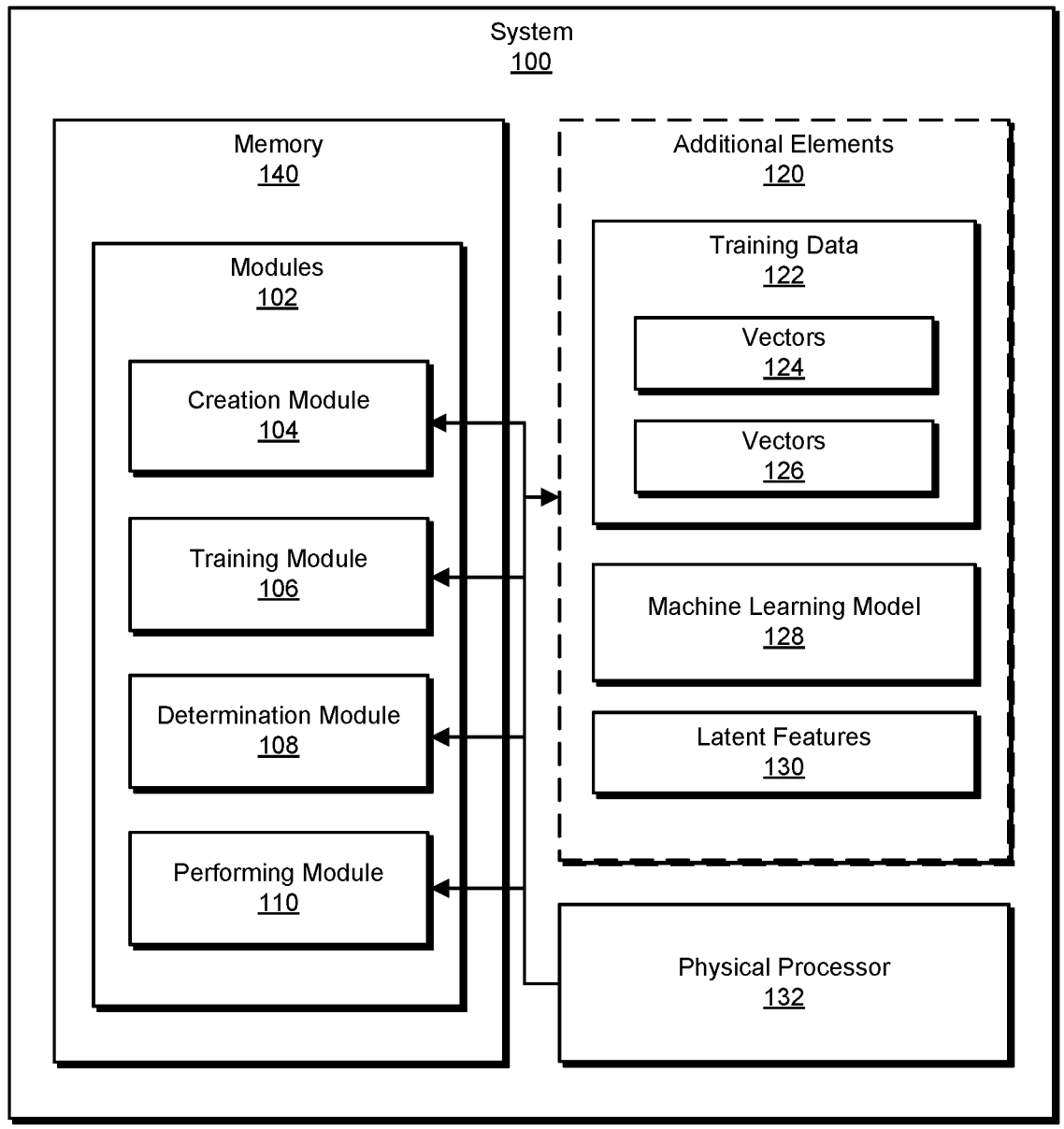
FIG. 1 is a block diagram of an example system for file system metadata analytics.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for file system metadata analytics. As will be explained in greater detail below, by using a machine learning model to make observations about tokens that allow tokens to be correlated, the various systems and methods described herein may be able to determine which files, users, and/or tags in a file system are related. Upon determining related files, users, and/or tags, the various systems and methods described herein may perform a variety of actions, such as enforcing security policy rules on related users and/or files and/or suggesting relevant tags for a file. By performing metadata analysis on a file system in this way, the various systems and methods described herein may improve the performance of systems that rely on information about the relatedness of users, files, and/or tags.

Moreover, the systems and methods described herein may improve the functioning and/or performance of a computing device (such as a file server) by improving the efficiency of operations involving the file system and/or users, files, and/or tags related to the file system. These systems and methods may also improve the field of metadata analysis by providing an efficient technique for determining related files, users, and/or tags based on an analysis of the metadata of a file system.

Figure 2:
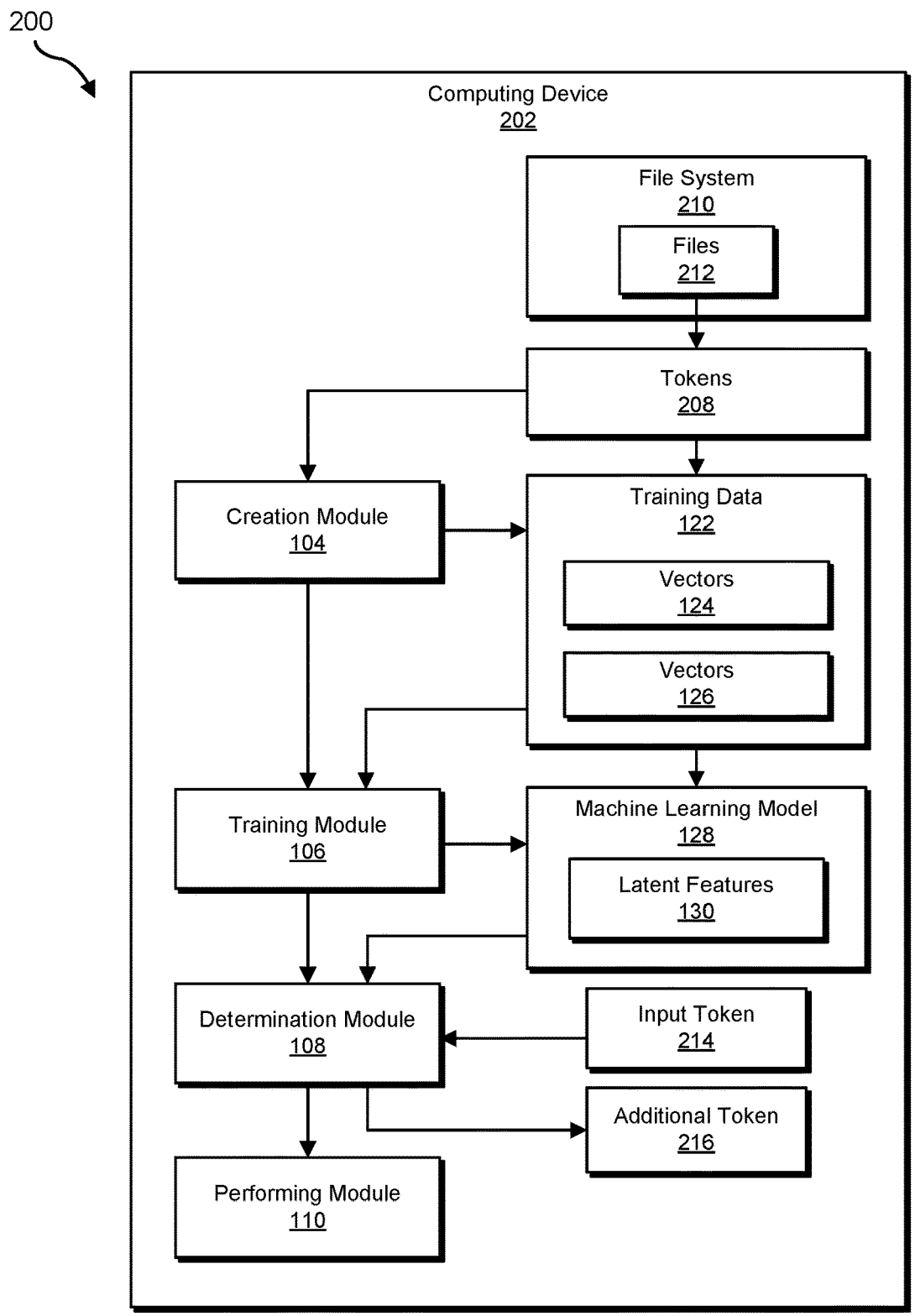
FIG. 2 is a block diagram of an additional example system for file system metadata analytics.
Figure 4:
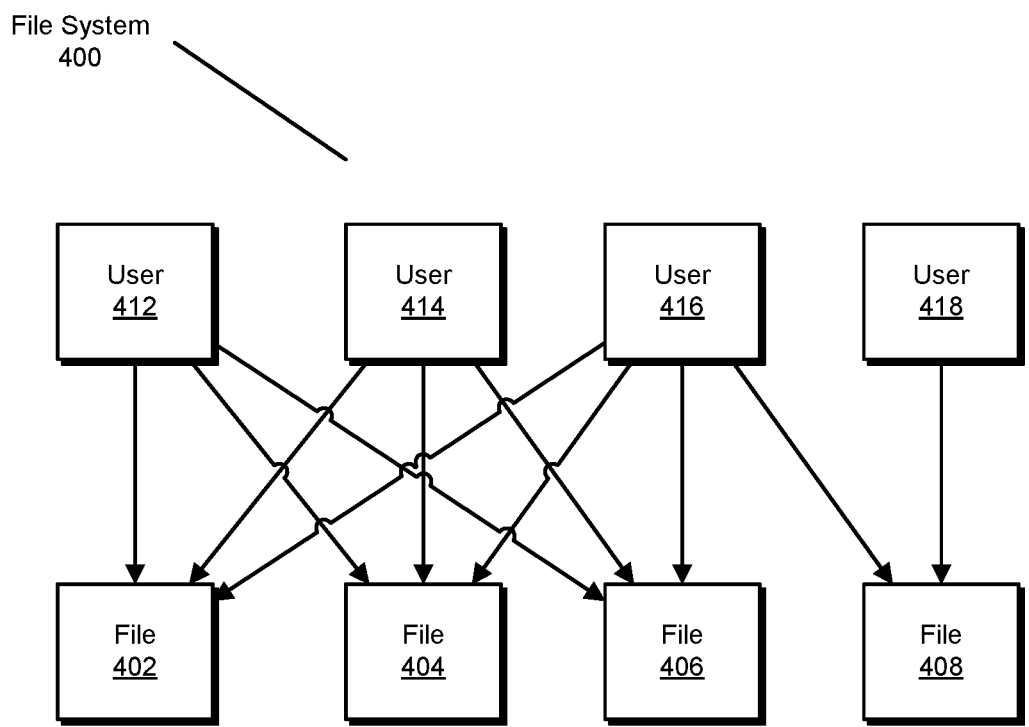
FIG. 4 is a block diagram of an example set of users and files.
Figure 5:
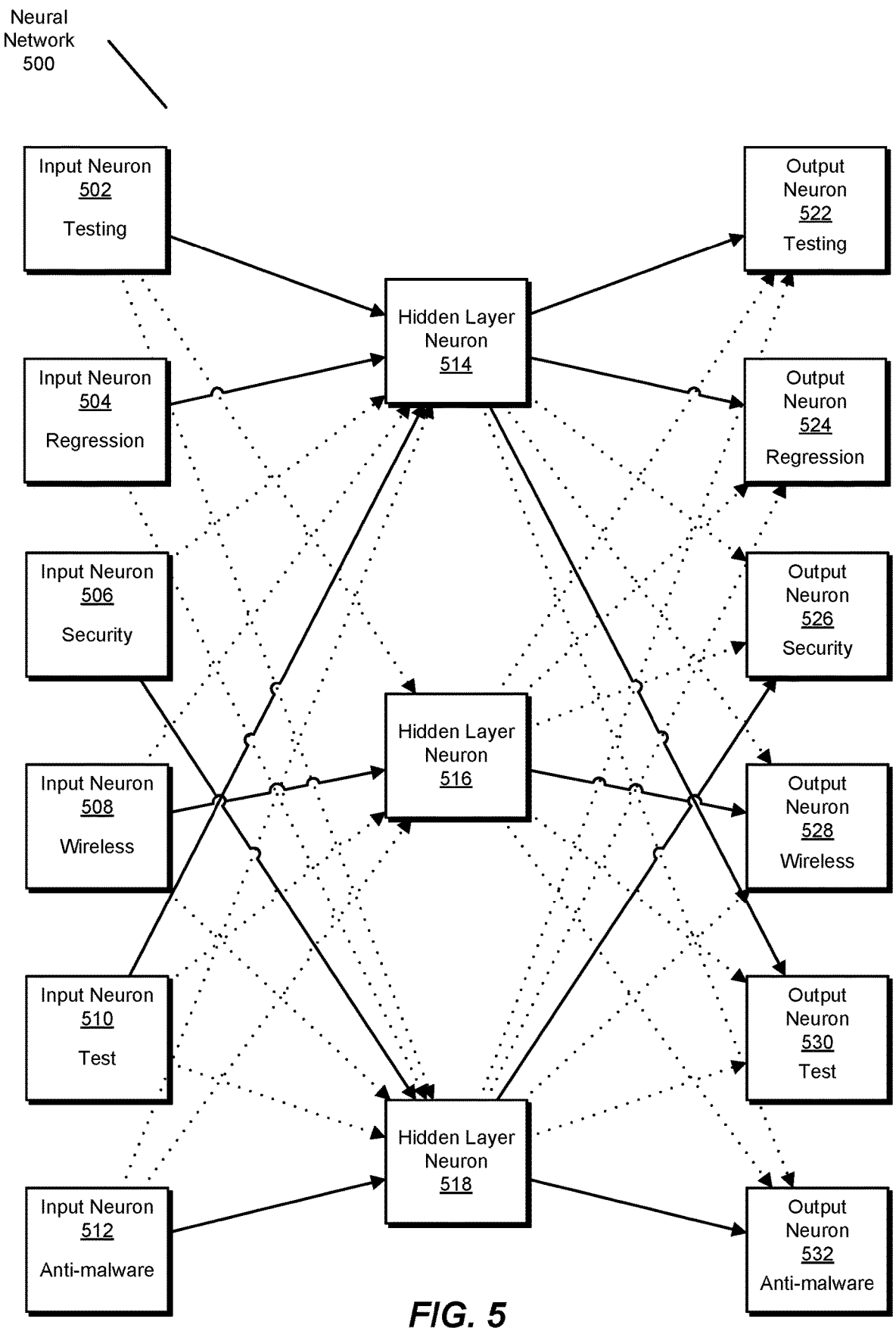
FIG. 5 is a block diagram of an example computing system for file system metadata analytics.

The following will provide, with reference to FIGS. 1, 2, and 5, detailed descriptions of example systems for file system metadata analytics. Detailed descriptions of corresponding computer-implemented methods will also be provided in connection with FIG. 3. In addition, detailed descriptions of example sets of files and/or users will be provided in connection with FIG. 4.

FIG. 1 is a block diagram of example system 100 for file system metadata analytics. As illustrated in this figure, example system 100 may include one or more modules 102 for performing one or more tasks. For example, and as will be explained in greater detail below, example system 100 may include a creation module 104 that creates a set of training data to train a machine learning model to analyze tokens within a set of tokens that describe files within a file system. In some embodiments, the set of training data may include both a first set of vectors, where each vector within the first set of vectors represents a subset of the set of tokens that describes files that are frequently accessed by a common set of users, and a second set of vectors, where each vector within the second set of vectors represents a subset of the set of tokens that describes files with a predetermined number of common file path ancestors. Example system 100 may additionally include a training module 106 that trains, using the set of training data, the machine learning model to define a set of latent features from the set of training data. Example system 100 may also include a determination module 108 that determines, by providing at least one input token from the set of tokens as input to the trained machine learning model, that the at least one input token is related to at least one additional token within the set of tokens. Example system 100 may additionally include a performing module 110 that performs an action responsive to observing the input token and involving the additional token and the file system in response to determining that the input token is related to the additional token. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 132. Physical processor 132 generally represents any type or form of hardware-implemented processing unit capable of interpreting and/or executing computer-readable instructions. In one example, physical processor 132 may access and/or modify one or more of modules 102 stored in memory 140. Additionally or alternatively, physical processor 132 may execute one or more of modules 102 to facilitate file system metadata analytics. Examples of physical processor 132 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as training data 122. Training data 122 generally represents any type or form of training data for a neural network. In some embodiments, training data 122 may include vectors 124 and/or vectors 126. Machine learning model 128 generally represents any type or form of machine learning algorithm and/or model. Latent features 130 generally represents any type or form of features generated by a machine learning model.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to perform file system metadata analytics.

Computing device 202 generally represents any type or form of computing device capable of reading computer-executable instructions. In some embodiments, computing device 202 may be a file server. Additionally or alternatively, computing device 202 may include a computing system connected to a file server. Additional examples of computing device 202 include, without limitation, laptops, desktops, tablets, analysis servers, storage servers, database servers, application servers, and/or web servers configured to run certain software applications and/or provide various storage, database, and/or web services. Although illustrated as a single entity in FIG. 2, computing device 202 may include and/or represent a plurality of computing devices that work and/or operate in conjunction with one another.

File system 210 generally represents any type or form of collection of files on one or more computing systems. Files 212 generally represent any type or form of data including, without limitation, document files, media files, text files, code files, and/or archive files. Tokens 208, input token 214, and/or additional token 216, generally represent any type or form of input to and/or output from a machine learning algorithm including, without limitation, representations of users, files, and/or tags.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
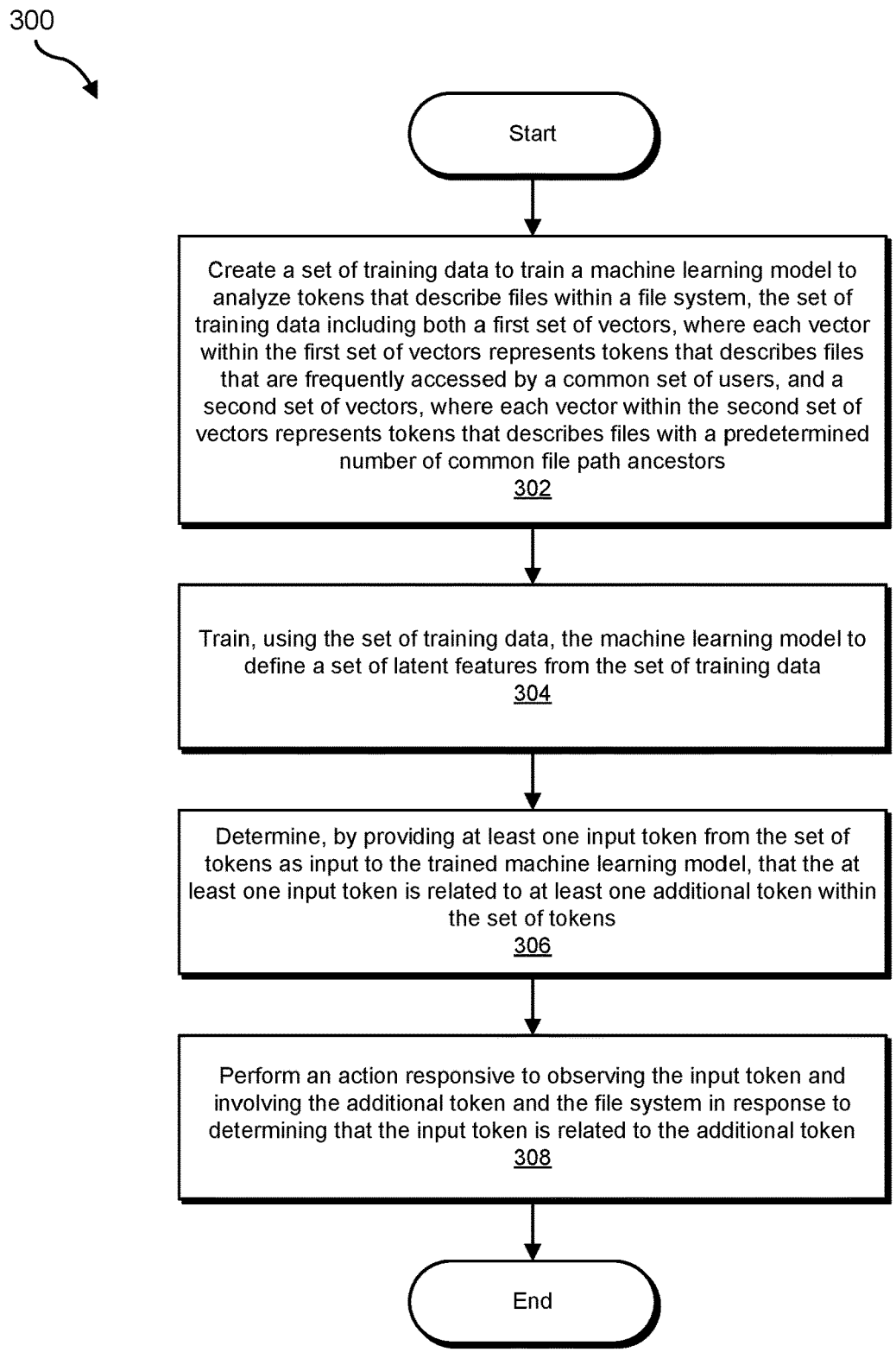
FIG. 3 is a flow diagram of an example method for file system metadata analytics.

FIG. 3 is a flow diagram of an example computer-implemented method 300 for file system metadata analytics. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may create a set of training data to train a machine learning model to analyze tokens within a set of tokens that describe files within a file system, the set of training data including both a first set of vectors, where each vector within the first set of vectors represents a subset of the set of tokens that describes files that are frequently accessed by a common set of users, and a second set of vectors, where each vector within the second set of vectors represents a subset of the set of tokens that describes files with a predetermined number of common file path ancestors. For example, creation module 104 may, as part of computing device 202 in FIG. 2, create a set of training data 122 to train machine learning model 128 to analyze tokens within set of tokens 208 that describe files 212 within file system 210, the set of training data 122 including both first set of vectors 124, where each vector within first set of vectors 124 represents a subset of set of tokens 208 that describes files that are frequently accessed by a common set of users, and second set of vectors 126, where each vector within second set of vectors 126 represents a subset of set of tokens 208 that describes files with a predetermined number of common file path ancestors.

The phrase "machine learning model," as used herein, generally refers to any type of algorithm, data set, model, and/or combination thereof that enables a computing system to make inferences about data. In one embodiment, the machine learning model may include a neural network that includes one or more input neurons, one or more hidden layers of neurons, and one or more output neurons. In some embodiments, the machine learning model may implement a continuous bag of words model. In some examples, a continuous bag of words model may take as input a vector that consists of contextually related tokens and as output a vector that consists of a target token that is related to the input tokens. In other embodiments, the machine learning model may implement a skip-gram model. In some examples, a skip-gram model may take as input a vector that consists of a target token and as output a vector that consists of contextually related tokens to the target token. Training a machine learning model with a continuous bag of words models and/or a skip-gram model may enable the machine learning algorithm to make inferences about which tokens in a given set commonly appear with other tokens in the set. Additionally or alternatively, the machine learning model may include any other suitable algorithm for training a neural network.

The term "tokens," as used herein, generally refers to any representation of data that describes and/or is associated with a file. In one embodiment, a token may include a string derived from a file path of a file within the file system. For example, the token "test" may be derived from the file path "//regression_test_pack/maintenance/input." In another embodiment, each token within the set of tokens may include a representation of a user that accesses at least one file within the file system. For example, a token may include an identifier of a user account on the file system, such as a user name and/or account number. In one embodiment, each token within the set of tokens may include a representation of a file within the file system. In some embodiments, the representation of a file may include a hash of the file, a signature of the file, an identifier of the file, and/or a name of the file.

The term "vector," as used herein, generally refers to any description of data in the form of a single column or single row matrix. In some embodiments, a vector may include a binary representation of whether a given token is present in a set of tokens. For example, if a set of tokens includes the strings, "security, testing, test, e-commerce, automation, malicious toaster, network, threatens" the phrase "malicious toaster threatens home automation security" may be represented with the vector "(1, 0, 0, 0, 1, 1, 0, 1)." In another example, if a set of tokens includes the strings "firewall, virus, anti-malware, definitions, update, detection, intrusion," the set of strings "virus, definitions, update" may be represented as the vector "(0, 1, 0, 1, 1, 0, 0)."

The phrase "frequently accessed by a common set of users," as used herein, generally refers to any files that are accessed regularly by the same set of users. For example, the systems described herein may determine that files are frequently accessed if the files are accessed more than a certain number of times within a predefined window of time. In some embodiments, "frequently accessed" may refer to files that are accessed on a daily basis by the same set of users. Additionally or alternatively, "frequently accessed" may refer to files that are accessed on a weekly or monthly basis by the same set of users. For example, as illustrated in FIG. 4, a file system 400 may include files 402, 404, 406, and/or 408 that may be accessed by users 412, 414, 416, and/or 418. In one example, users 412, 414, and 416 may each access all of files 402, 404, and/or 406. In this example, files 402, 404, and/or 406 may be files accessed by a common set of users. In some examples, user 416 may also access file 408 and/or user 418 may access file 408. In these examples, file 408 is not accessed by a common set of users because users 416 and 418 do not access any other files in common.

The term "common file path ancestors," as used herein, generally refers to files that share one or more folders in the file path hierarchy. For example, the file "//testing/integration/continuous/unit_test.pl" may share one common file path ancestor with the file "//testing/old/archive.zip" and three common ancestors with the file at the file path "//testing/integration/continuous/readme.txt." In some embodiments, the systems described herein may set a predetermined threshold for number of file path ancestors. for example, the systems described herein may determine that a file has common file path ancestors with another file if the file shares two or more common ancestors.

Creation module 104 may create the set of training data in a variety of ways. In some embodiments, creation module 104 may create a first training file with the first set of vectors, create a second training file with the second set of vectors, and then combine both training files into one training file. In one embodiment, creation module 104 may create the first training file where each line is a sequence of tokens from multiple files accessed by the same user. In this embodiment, the first training file may have as many lines as there are users of the file system. In one embodiment, creation module 104 may create the second training file where each line is a sequence of tokens from multiple files that meet or exceed a predefined threshold of common ancestors.

Returning to FIG. 3, at step 304, one or more of the systems described herein may train, using the set of training data, the machine learning model to define a set of latent features from the set of training data. For example, training module 106 may, as part of computing device 202 in FIG. 2, train, using the set of training data 122, machine learning model 128 to define a set of latent features 130 from the set of training data 122.

The term "latent features," as used herein, generally refers to any part of a machine learning model that is not explicitly supplied by the training data. In some examples, the term "latent features" may refer to a description and/or mapping of input variables to fewer dimensions. For example, a machine learning model may take input data that describes a sample as a many-dimensional data point and map the input data to a lower-dimensional space described by the latent features. In one embodiment, the latent features of a neural network may include the values of the neurons in the hidden layer and/or the weights of the edges between neurons.

Training module 106 may use the set of training data to train the machine learning model in a variety of ways. For example, training module 106 may use a continuous bag of words algorithm to train a neural network. In another example, training module 106 may use a skip-gram algorithm to train a neural network.

In some embodiments, training module 106 may train a neural network to take as input vectors that represent tags for files and produce as output vectors that represent tags related to the tags in the input vector. For example, as illustrated in FIG. 5, neural network 500 may include input neurons 502, 504, 506, 508, 510, and/or 512, hidden layer neurons 514, 516, and/or 518, and/or output neurons 522, 524, 526, 528, 513, and/or 532. In this example, each token in a set of tokens may be represented by both an input neuron (e.g., input neuron 502 may represent the token "testing") and an output neuron (e.g., output neuron 522 may also represent the token "testing").

In some embodiments, each input neuron may originally be connected to each hidden layer neuron by edges of equal weight and/or each hidden layer neuron may originally be connected to each output neuron by edges of equal weight. Additionally or alternatively, hidden layer neurons may themselves have weights that may start at equal values. In some examples, training module 106 may use the training data to train the neural network such that the weights of some edges increase and/or the weights of other edges decrease, resulting in a neural network with stronger connections between more relevant tokens. For example, the hidden layer neuron 514 may have high weighted edges with input neurons 502, 504, and/or 510 and/or output neurons 522, 524, and/or 530, representing that the tokens "testing," "regression," and "test" may be related. In some embodiments, training module 106 may train a neural network to have weights on the hidden layer neurons in addition or instead of on the edges between neurons.

In some embodiments, training module 106 may train a neural network to produce a model file where each line includes a token and a vector that represents the weights of the hidden layer neurons for that token. In one embodiment, training module 106 may present the neural network with a single token on the input layer and a set of tokens that co-appear with the token on the output layer in order to produce the weights of the hidden layer neurons.

Returning to FIG. 3, at step 306, one or more of the systems described herein may determine, by providing at least one input token from the set of tokens as input to the trained machine learning model, that the at least one input token is related to at least one additional token within the set of tokens. For example, determination module 108 may, as part of computing device 202 in FIG. 2, determine, by providing at least one input token 214 from set of tokens 208 as input to the trained machine learning model 128, that the at least one input token 214 is related to at least one additional token 216 within set of tokens 208.

Determination module 108 may determine that the token is related to the additional token in a variety of ways. For example, determination module 108 may receive a vector representing the token from the machine learning model and may use a cosine similarity function to compare the token to the additional token. In some embodiments, determination module 108 may use a function that takes multiple tokens as inputs in order to find the similarity between one input token and multiple additional tokens and/or multiple input tokens and multiple additional tokens.

At step 308, one or more of the systems described herein may perform an action responsive to observing the input token and involving the additional token and the file system in response to determining that the input token is related to the additional token. For example, performing module 110 may, as part of computing device 202 in FIG. 2, perform an action responsive to observing input token 214 and involving additional token 216 and file system 210 in response to determining that input token 214 is related to the additional token.

Performing module 110 may perform a variety of actions. In some examples, performing module 110 may perform the action responsive to observing the input token and involving the additional token and the file system by suggesting the additional token as a tag for a file that has a file path that includes the input token and/or has a common file path ancestor with a file that has a file path that includes the input token. In other examples, performing module 108 may automatically apply the tag instead of or in addition to suggesting the tag.

In some examples, performing module 110 may perform the action responsive to observing the input token and involving the additional token and the file system by suggesting that a related user represented by the additional token is related to a user represented by the input token. For example, performing module 110 may categorize the user in the same category as the related user, return the user in a search result for a characteristic of the related user, and/or list the user as related to the user. In one embodiment, performing module 110 may, in response to suggesting that the related user is related to the user, apply a data loss prevention policy rule that applies to the user to an interaction between the related user and the file system. For example, if the related user is in the "engineer" user category and is only allowed to modify files in the "engineer files" file category, the systems described herein may place the user in the "engineer" user category and/or prevent the user from modifying files outside the "engineer files" category.

In some examples, performing module 110 may perform the action responsive to observing the input token and involving the additional token and the file system by suggesting that a related file represented by the additional token is related to a file represented by the input token. In one embodiment, performing module 110 may perform, on the related file, an action performed on the file in response to suggesting that the related file represented by the additional token is related to the file. For example, performing module 110 may list the file in search results for a characteristic of the related file, suggest tags from the related file for the file, and/or apply a security policy to the file that applies to the related file. In some examples, performing module 110 may apply a backup policy to a file in response to determining that the file is related to another file to which the backup policy applies. For example, performing module 110 may copy a file to a secure storage location in response to determining that the file is related to a file that is required by policy to be backed up in a secure storage location. Additionally or alternatively, performing module 110 may store a file to a specific tier of storage in response to determining that the file is related to one or more other files that are stored in the specific tier of storage.

As explained in connection with method 300 above, the systems and methods described herein may use machine learning techniques to find correlated users, files, and/or tags in a file system. By performing metadata-based analytics on a file system, the systems and methods described herein may obtain useful information about files and/or users without the computational expense of examining the contents of files. By performing automated suggestions of tags, grouping of users, and/or grouping of files, the systems and methods described herein may improve the efficiency and/or security of a file system and/or other systems that rely on accurate categorization of items related to the file system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method at least a portion of the method being performed by a computing device comprising at least one processor, the method comprising:
    generating at least one training file comprising a set of tokens describing metadata for files included in a file system;
    generating, based on the at least one training file and by a neural network, a model file comprising vector representations of each token in the set of tokens,
        the vector representations comprising:
            a first set of vectors representing a subset of the set of tokens that describes files that are accessed by a common set of users; and
            a second set of vectors representing a subset of the set of tokens that describes files with a predetermined number of common file path ancestors; and
        the generating comprising applying a set of latent features of the neural network to each token in the set of tokens, wherein:
            the set of latent features comprise weights of hidden layer neurons included in the neural network that are associated with the respective token, and
            the vector representations of each token in the set of tokens comprise the weights of the hidden layer neurons for that respective token;
    determining, using the model file, that a first token describing metadata for a first file is related to at least one token in the set of tokens based on the metadata for the first file; and
    in response to determining that the first token is related to the at least one token in the set of tokens, performing an action on the first file based on the relationship between the first token and the at least one token in the set of tokens.

2. The computer-implemented method of claim 1, wherein each token within the set of tokens comprises a string derived from a file path of a file within the file system.

3. The computer-implemented method of claim 2, wherein performing the action on the first file comprises suggesting the at least one token in the set of tokens as a tag for the first file that comprises at least one of:
    a file path that comprises the first token; and a common file path ancestor with a file that comprises a file path that comprises the first token.

4. The computer-implemented method of claim 1, wherein each token within the set of tokens comprises a representation of a user that accesses at least one file within the file system.

5. The computer-implemented method of claim 4, wherein performing the action on the first file comprises suggesting that a related user represented by the at least one token in the set of tokens is related to a user represented by the first token.

6. The computer-implemented method of claim 5, further comprising, in response to suggesting that the related user is related to the user, applying a data loss prevention policy rule that applies to the user to an interaction between the related user and the file system.

7. The computer-implemented method of claim 1, wherein each token within the set of tokens comprises metadata for a representation of a file within the file system.

8. The computer-implemented method of claim 7, wherein performing the action on the first file comprises suggesting that a related file represented by the at least one token in the set of tokens is related to the first file.

9. The computer-implemented method of claim 8, further comprising performing, on the related file, the action performed on the first file in response to suggesting that the related file represented by the at least one token in the set of tokens is related to the first file.

10. The computer-implemented method of claim 1, wherein:
a machine learning model comprises the neural network; and
the neural network is trained to generate the model file.

11. A system comprising:
a training module, stored in memory;
a creation module, stored in memory, that generates at least one training file comprising a set of tokens describing metadata for files included in a file system;
a machine learning model, stored in memory, comprising a neural network that generates, based on the at least one training file, a model file comprising vector representations of each token in the set of tokens, wherein:
the vector representations comprise:
a first set of vectors representing a subset of the set of tokens that describes files that are accessed by a common set of users; and
a second set of vectors representing a subset of the set of tokens that describes files with a predetermined number of common file path ancestors; and
the generating comprises applying, by the training module, a set of latent features of the neural network to each token in the set of tokens, wherein:
the set of latent features comprise weights of hidden layer neurons included in the neural network that are associated with the respective token, and
the vector representations of each token in the set of tokens comprise the weights of the hidden layer neurons for that respective token;
a determination module, stored in memory, that determines, using the model file, that a first token describing metadata for a first file is related to at least one token in the set of tokens based on the metadata for the first file;
a performing module, stored in memory, that performs, in response to determining that the first token is related to the at least one token in the set of tokens, an action on the first file based on the relationship between the first token and the at least one token in the set of tokens; and
at least one physical processor configured to execute the creation module, the training module, the determination module, the machine learning model, and the performing module.

12. The system of claim 11, wherein each token within the set of tokens comprises a string derived from a file path of a file within the file system.

13. The system of claim 12, wherein performing the action on the first file comprises suggesting the at least one token in the set of tokens as a tag for the first file that comprises at least one of:
a file path that comprises the first token; and
a common file path ancestor with a file that comprises a file path that comprises the first token.

14. The system of claim 11, wherein each token within the set of tokens comprises a representation of a user that accesses at least one file within the file system.

15. The system of claim 14, wherein performing the action on the first file comprises suggesting that a related user represented by the at least one token is related to a user represented by the first token.

16. The system of claim 15, wherein the performing module, in response to suggesting that the related user is related to the user, applies a data loss prevention policy rule that applies to the user to an interaction between the related user and the file system.

17. The system of claim 11, wherein each token within the set of tokens comprises metadata for a representation of a file within the file system.

18. The system of claim 17, wherein performing the action on the first file comprises suggesting that a related file represented by the at least one token in the set of tokens is related to the first file.

19. The system of claim 18, wherein the performing module performs, on the related file, the action performed on the first file in response to suggesting that the related file represented by the at least one token in the set of tokens is related to the first file.

20. A non-transitory computer-readable medium comprising one or more computer-readable instructions that, when executed by at least one processor of a computing device, cause the computing device to:
generate at least one training file comprising a set of tokens describing metadata for files included in a file system;
generate, based on the at least one training file and by a neural network, a model file comprising vector representations of each token in the set of tokens,
the vector representations comprising:
a first set of vectors representing a subset of the set of tokens that describes files that are accessed by a common set of users; and
a second set of vectors representing a subset of the set of tokens that describes files with a predetermined number of common file path ancestors; and
the generating comprising applying a set of latent features of the neural network to each token in the set of tokens, wherein:
the set of latent features comprise weights of hidden layer neurons included in the neural network that are associated with the respective token, and
the vector representations of each token in the set of tokens comprise the weights of the hidden layer neurons for that respective token;

determine, using the model file, that a first token describing metadata for a first file is related to at least one token in the set of tokens based on the metadata for the first file; and in response to determining that the first token is related to the at least one token in the set of tokens, perform an action on the first file based on the relationship between the first token and the at least one token in the set of tokens.

\* \* \* \* \*